W. H. KRUG.
MEANS FOR SECURING ANTISKID CHAINS TO VEHICLE WHEELS.
APPLICATION FILED JAN. 12, 1920.

1,330,876.

Patented Feb. 17, 1920.
2 SHEETS—SHEET 1.

Inventor
William H. Krug
By *Williams Bradbury*
Attorneys.

W. H. KRUG.
MEANS FOR SECURING ANTISKID CHAINS TO VEHICLE WHEELS.
APPLICATION FILED JAN. 12, 1920.

1,330,876.

Patented Feb. 17, 1920.

Inventor
William H. Krug.
By Williams Bradbury
See
Attorneys.

UNITED STATES PATENT OFFICE.

WILLIAM H. KRUG, OF FOND DU LAC, WISCONSIN.

MEANS FOR SECURING ANTISKID-CHAINS TO VEHICLE-WHEELS.

1,330,876.

Specification of Letters Patent. Patented Feb. 17, 1920.

Application filed January 12, 1920. Serial No. 350,901.

*To all whom it may concern:*

Be it known that I, WILLIAM H. KRUG, a citizen of the United States, residing at Fond du Lac, in the county of Fond du Lac and State of Wisconsin, have invented certain new and useful Improvements in Means for Securing Antiskid-Chains to Vehicle-Wheels, of which the following is a full, clear, concise, and exact description, reference being had to the accompanying drawings, forming a part of this specification.

My invention relates to improvements in means for securing anti-skid chains to vehicle wheels, and is particularly concerned with the provision of means whereby the anti-skid chains can be easily and quickly attached to and detached from the vehicle wheels.

The objects of my invention are:

First: To provide a device of this kind comprising a single bar provided at each end with a hook for securing one end of an anti-skid chain, and an opening for co-acting with a coupling member secured to the opposite end of the anti-skid chain to lock the last mentioned end of the skid chain to the bar, the whole being so constructed that it can be easily manufactured by the die forging process;

Second: To provide a device of the character described, so constructed that it can be used on a large number of different types of vehicles wherein the spokes are of different sizes, shapes, and differently spaced;

Third: To provide a device for securing anti-skid chains to wheels, which is especially advantageous when used in connection with vehicles wherein either the driving mechanism or the brake mechanism comes into close proximity to the spokes and felly of the wheel, the device being so constructed that if the anti-skid chain should break, that portion of it secured to the side of the wheel adjacent the body of the vehicle usually will be discharged from the wheel before it has an opportunity to become entangled with the driving or brake mechanism;

Fourth: To provide a device of the character described which is especially applicable to wheels wherein the spaces between the spokes are comparatively small; and Fifth: To provide a device such as described above, which is simple in construction and economical to manufacture, Other objects will appear as this description progresses, reference being had to the accompanying drawings, in which—

Throughout the several views similar reference characters will be used for referring to similar parts.

Figure 1:
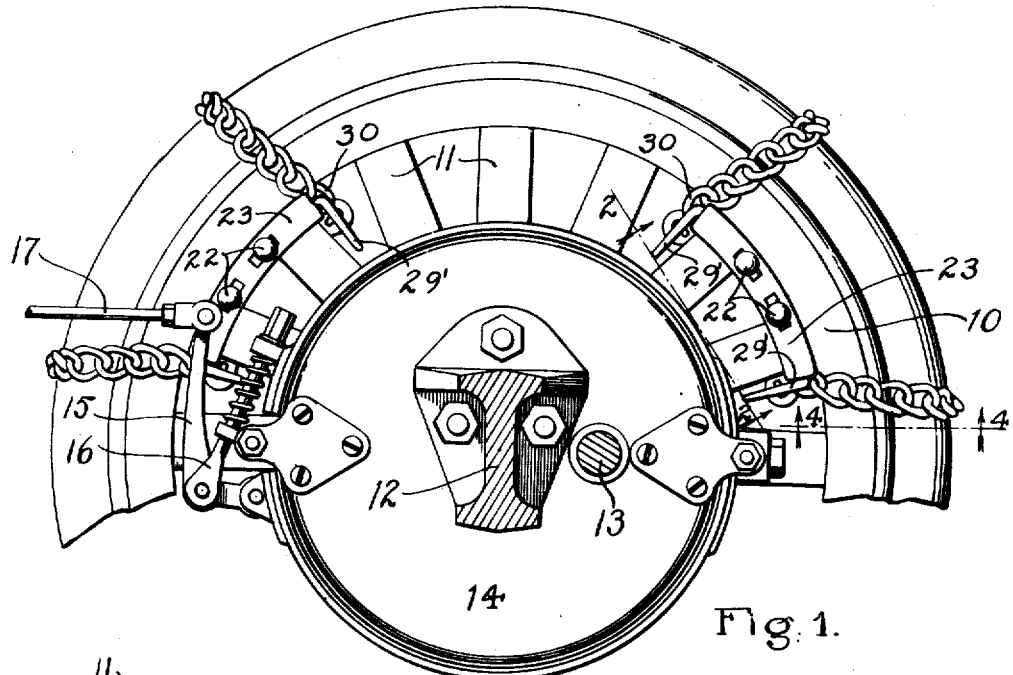
Figure 1 is a side elevation of a wheel having anti-skid chains attached thereto by devices constructed in accordance with my invention, the view showing the side of the wheel adjacent to the body of the vehicle, and also showing brake mechanism of a type found on certain makes of motor trucks.
Figure 2:
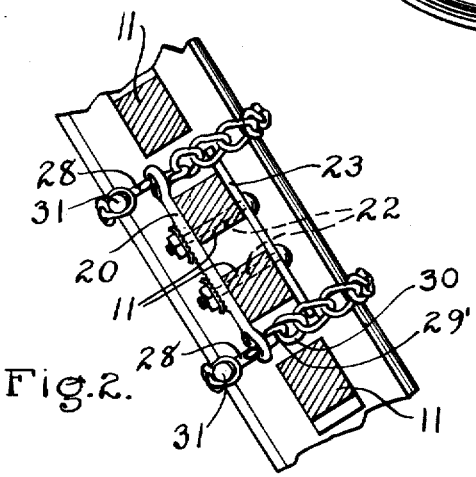
Fig. 2 is a sectional detail taken on line 2—2 of Fig. 1.

Referring to the drawings, the reference character 10 indicates the felly of a wheel having the spokes 11 and rotatably mounted upon the axle 12, the wheel being driven by a shaft 13 in a well known manner. With drives of this type the brake drum 14 is unusually large in diameter and the lever 15, tension device 16, and connecting rod 17 lie unusually close to the felly. When an anti-skid chain on a wheel of a vehicle constructed as described above breaks, it often happens that the end portion of the chain on the side of the wheel adjacent the vehicle body becomes entangled in the brake operating mechanism, with resulting damage thereto. One of the objects of my invention, as stated above, is to provide means for discharging the last mentioned portion of the anti-skid chain in the event it becomes broken, so that it will not ordinarily become entangled with the brake mechanism.

I shall now describe the means which I employ for securing anti-skid chains to wheels of vehicles constructed as described above. It should, however, be clearly understood that my invention is not limited to use in connection with vehicles of the type referred to.

Referring to Figs. 1 to 4 inclusive, my invention comprises a bar 20 having slots 21 formed therein for receiving the bolts 22, which extend between adjacent spokes of the vehicle wheel, and the heads of which bear against a bar 23 cut from bar metal, the bars 23 having openings formed therein through which the bolts 22 pass. The face of the bar 20 remote from the vehicle body is provided with a plurality of transversely extending corrugations 24 to co-act with the nut locking washers 25.

Figure 4:
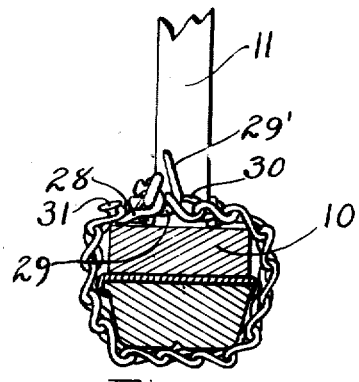
Fig. 4 is a transverse section through the felly of the wheel shown in Fig. 2, taken substantially upon the line 4—4 of Fig. 1.
Figure 3:
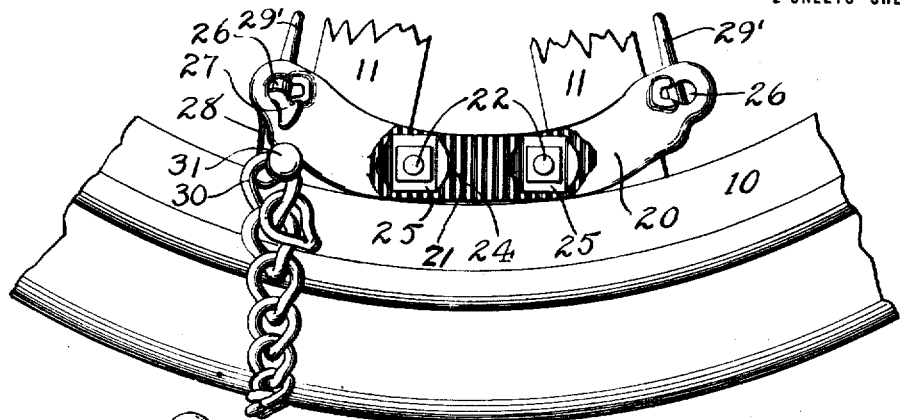
Fig. 3 is a side elevation of the wheel shown in Figs. 1 and 2, showing my improved device secured thereto in side elevation, this view being of that side of the wheel remote from the vehicle body, portions of the wheel being broken away.

The ends of each bar 20 are edgewise offset, as shown in Figs. 1, 3 and 4, to provide a clearance space between the edgewise offset end portions and the felly, for a purpose which will be referred to later on. Each offset end portion of the bar 20 has formed therein a keyhole slot 26, through which the T-head 27 of the coupling member 28 can be manipulated by bringing it into proper registery with the keyhole opening. When in use the coupling member turns so as to bring the crosshead 27 at substantially right angles to the slot of the keyhole opening 26, whereby it is prevented from becoming uncoupled from the bar 20.

Figure 5:
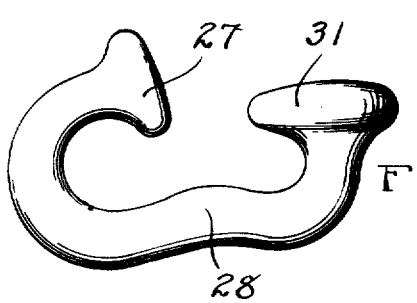
Fig. 5 is a side elevation of a coupling member which I employ for securing one end of an anti-skid chain to my improved securing device.

Formed integrally with each offset end portion is a hook having the bight 29 and the bill 29', the hook lying in a plane extending at substantially right angles to the bar and transversely thereof. It will be noted that the bill of the hook inclines toward the center of the vehicle wheel but away from the body of the vehicle. Consequently, if a chain breaks, the tendency is for the bill portion of the hook to discharge the chain away from the body of the vehicle, so as to prevent it from becoming entangled with the brake mechanism or with the driving mechanism in case chain drives of certain types are employed. In attaching a chain to my improved securing device, the link 30 at one end of the anti-skid chain is first passed over the bill 29' of the hook. The opposite end of the chain is provided with a coupling member, such as that shown in Fig. 5, which has a head for preventing it from being detached from the chain, and the opposite end of the coupling member; that is, the end provided with the crosshead 27, is then manipulated through the keyhole opening 26, as described above. Ordinarily there is insufficient slack in the chain to permit the link 30 from being accidentally released from the bill 29' without the other end of the chain being first detached from the securing device. Since the last mentioned end of the chain is locked to the securing device by the coupling member, it will readily be apparent that a single coupling member in effect locks both ends of the chain to the securing device. It will also be noted that the shank of the coupling member 28 is free to swing in the space between the offset end portion of the bar 20 and the felly, so as to adjust itself to all strains placed thereon.

It will be noted from an inspection of Figs. 1 to 4 inclusive that the hooks forming a part of the securing device extend between the spokes of the wheel toward the body of the vehicle but do not project beyond the spokes on the side of the wheel adjacent the body. This construction avoids the objections to devices heretofore in use, which comprise various kinds of hooks and securing devices extending beyond the spokes toward the body of the wheel.

Figure 6:
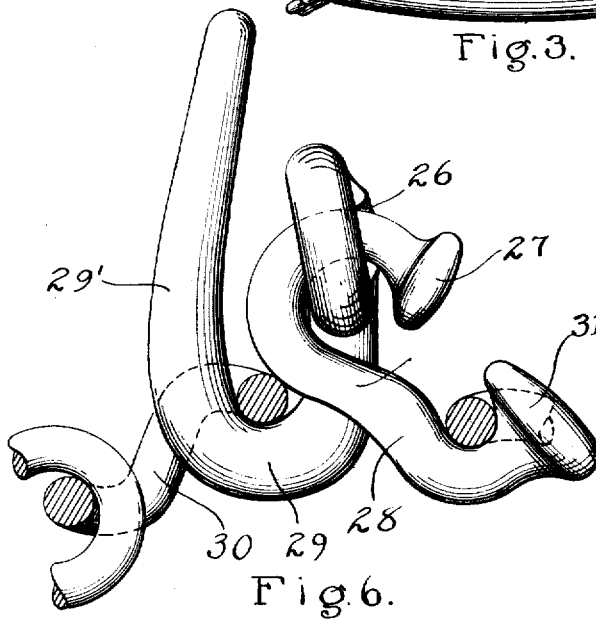
Fig. 6 is an end elevation upon an enlarged scale, of my improved securing device, showing the manner in which I secure both ends of an anti-skid chain thereto.

In the construction illustrated in Figs. 1 to 4 inclusive, the coupling member 28 locks the opposite end of the chain to the securing device only so long as the chain remains unbroken. As described above, if the chain breaks the inner end thereof is discharged from the wheel and usually lost. In Fig. 6 I have illustrated a modified form of my invention in which, even though the chain itself breaks, neither end thereof will become lost. This construction can be used on motor vehicles, where there is no objection to the inner end of the chain remaining secured to the wheel after the chain is broken. In this construction it will be noticed that the thickness of the coupling member 28 is such, relative to the distance between the bill 29' of the hook and the adjacent end of the bar 20, that after the link 30 has been passed over the bill 29' and the coupling member 28 engaged with the keyhole opening, the coupling member 28 mechanically locks the link 30 in the bight of the hook, there being insufficient space between the coupling member and the bill of the hook to permit the link 30 to pass therebetween.

Figure 7:
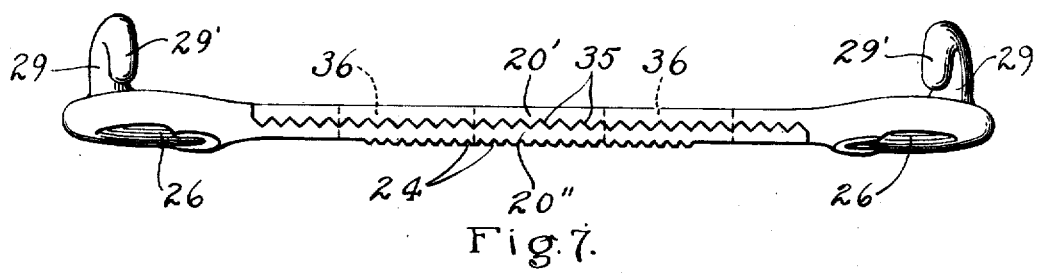
Fig. 7 is an edge view of a modified form of my invention.

In Fig. 7 I have illustrated another embodiment of my invention, wherein the bar 20 is divided longitudinally and transversely so as to form two parts 20' and 20'', which are provided on their contact sides with transverse interlocking corrugations 35, whereby they can be securely locked against longitudinal movement relative to each other when bolts are passed through the slots 36 indicated in dotted lines, and the bar is clamped against a pair of spokes. By thus dividing the bar into two parts, adjustable relative to each other, the ends of the bars can be adjusted to and from each other to accommodate the securing device to wheels having wheels spaced different distances apart.

Figure 8:
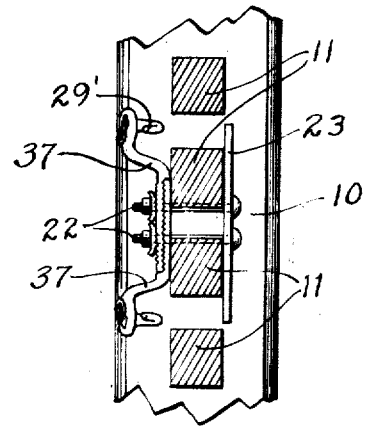
Fig. 8 is a view similar to Fig. 2, showing a still further modification of my invention.

In Fig. 8 another modification of my invention is described, which is especially adaptable to securing antiskid chains to wheels known in the trade as the "Sewell cushion" type of wheel, or to any other wheel wherein the spokes are unusually close together. With wheels of such construction it would be more or less difficult to manipulate the links of chains over the hooks projecting from the ends of the securing device, where these hooks extend between the spokes, as shown in Figs. 1 to 4 inclusive. To obviate this difficulty I offset the ends of the securing device laterally, as well as in an edgewise direction as indicated at 37, so as to position the hooks outwardly from between the spokes, where they are readily accessible for the purpose of attaching and detaching the chains thereto. Otherwise the construction of this securing device is similar to that shown in Figs. 1 to 4, inclusive. It will be noted that I have illustrated the securing device in Fig. 8 as being divided longitudinally and transversely in accordance with the modification shown in Fig. 7, and it will be clear that this securing device can be constructed so that one end of a broken chain can be freely discharged therefrom, as with the construction shown in Figs. 1 to 4 inclusive, or locked thereto as in the construction shown in Fig. 6.

From the above description it will be seen that it requires but a single forging to secure both ends of two anti-skid chains to a wheel, thereby considerably reducing the cost of manufacture as compared with prior constructions, wherein two forged clamps have been employed for securing both ends of two anti-skid chains to a wheel. The bar or clamp 22 need not be a forging, but can be easily and economically manufactured from bars of steel or other suitable material.

While I have described the details of the preferred embodiment of my invention, it is to be clearly understood that my invention is not limited to these details, but is capable of other adaptations and modifications within the scope of the appended claims.

Having thus described my invention, what I claim is:

1. Means for securing an anti-skid chain to a vehicle wheel, comprising a bar adapted to be secured to a wheel in a position parallel with a lateral surface of said wheel and with one edge against the felly of the wheel, the end of said bar having an opening formed therein and being edgewise offset in a direction away from that edge thereof which is adapted to contact with the felly of the wheel, and also being laterally offset, a hook formed integrally with said offset end, said hook lying in a plane extending at an angle to the bar, the bill of said hook being inclined toward said bar, and a coupling member for co-acting with said opening, to secure one end of an anti-skid chain to said bar, and for co-acting with the bill of said hook to lock the other end of said chain to said hook.

2. Means for securing an anti-skid chain to a vehicle wheel, comprising a bar adapted to be secured to a wheel in a position parallel with a lateral surface of said wheel and with one edge against the felly of the wheel, the end of said bar having an opening formed therein and being edgewise offset in a direction away from that edge thereof which is adapted to contact with the felly of the wheel, a hook formed integral with said offset end, said hook lying in a plane extending at an angle to the bar, and a coupling member for co-acting with said opening, to secure one end of an anti-skid chain to said bar, and for co-acting with the bill of said hook to lock the other end of said chain to said hook.

3. Means for securing an anti-skid chain to a vehicle wheel, comprising a bar adapted to be secured to a wheel in a position parallel with a lateral surface of said wheel and with one edge against the felly of the wheel, the end of said bar having an opening formed therein and being edgewise offset in a direction away from that edge thereof which is adapted to contact with the felly of the wheel, a hook formed integral with said offset end, said hook lying in a plane extending at an angle to the bar, and a coupling member for co-acting with said opening, to secure one end of an anti-skid chain to said bar.

4. Means for securing an anti-skid chain to a vehicle wheel, comprising a bar adapted to be secured to a wheel in a position parallel with a lateral surface of said wheel, and with one edge against the felly of the wheel, the end of said bar having an opening formed therein and being edgewise offset in a direction away from that edge thereof which is adapted to contact with the felly of the wheel, and a hook formed integral with said offset end, said hook lying in a plane extending at an angle to the bar.

5. Means for securing an anti-skid chain to a vehicle wheel, comprising a bar having an edgewise offset end portion provided with an opening, and a hook formed integral with said end portion and lying in a plane extending at an angle to said bar, the bill of said hook being inclined toward said bar.

6. Means for securing an anti-skid chain to a vehicle wheel, comprising a bar having an edgewise offset end portion provided with an opening, and a hook formed integral with said end portion and lying in a plane extending at an angle to said bar.

7. Means for securing an anti-skid chain to a vehicle wheel, comprising a bar having an end portion provided with an opening, and a hook formed integral with said end portion and lying in a plane extending at an angle to said bar.

8. Means for securing an anti-skid chain to a wheel, comprising a bar to be clamped to a lateral surface of a vehicle wheel, one end of said bar having an opening formed therein, and a hook formed integral therewith.

9. The combination with a bar having a hook extending at an angle thereto and formed integrally therewith, of means for detachably securing one end of a chain to a portion of said bar distinct from said hook, said means co-acting with said hook to lock the other end of the chain to said bar.

10. Means for securing an anti-skid chain to a vehicle wheel, comprising a bar having an edgewise offset end portion provided with an opening, and a hook formed integrally with said end portion.

In witness whereof I hereunto subscribe my name this 6th day of January, 1920.

WILLIAM H. KRUG.

Witnesses:
 H. B. OSGOOD,
 W. A. HARMON.

DISCLAIMER.

1,330,876.— *William H. Krug*, Fond du Lac, Wis. MEANS FOR SECURING ANTI-SKID-CHAINS TO VEHICLE-WHEELS. Patent dated February 17, 1920. Disclaimer filed May 16, 1921, by the patentee.

Hereby enters this disclaimer—

"To those parts of claims 6 and 10 of said patent which are in the following words: 'a bar having an edgewise offset end portion' except where the edgewise offset end portion provides a clearance-space between it and the felly of the wheel, to which said bar is secured, for the passage of a portion of an antiskid-chain; and further enters this disclaimer to those parts of claims 7 and 8 which are, respectively, in the following words: 'a bar having an end portion provided with an opening' and 'one end of said bar having an opening formed therein,' except where said opening is used for securing one end of an antiskid-chain."

[*Official Gazette, May 17, 1921.*]